Patented Aug. 3, 1954

2,685,570

UNITED STATES PATENT OFFICE 2,685,570

PROCESS FOR PRECIPITATING SYNTHETIC POLYAMIDES IN COMBINATION WITH SILK FIBER

Edward Erlick Verdiers, London, England

No Drawing. Application February 28, 1952, Serial No. 274,049

9 Claims. (Cl. 260—6)

This invention relates to the treatment of fibrous material of synthetic linear polyamides and similar polymers, commonly known as nylon, in conjunction with natural silk fibres or silk fibroin, and to the manufacture of composition products thereof.

The present application is a continuation-in-part of my application Serial No. 53,154 filed on the 6th of October 1948, and now abandoned.

In general the principles of the invention are applicable to such polyamides as polyhexametylene adipamide, polyhexamethylene and polydecamethylene sebacamide, as well as to hexamethylene diammonium adipate, hexamethylene diammonium sebacate, interpolyamides of amino caproic acid and caprolactam and derivatives of polycarboxylic acids.

It has already been proposed in Swiss specification No. 246,263 to treat polyamide waste with sulphuric acid to produce a fine powder having the same molecular weight as the starting material. The final product exhibits no greater adsorbency than the polyamide fibres prior to the treatment. It has also been proposed in U. S. specification No. 2,359,878 to treat polyamides including waste fibres with non-degrading solvents whereby fine solid particles may be produced. In the same specification it has been further proposed to treat solutions of different polyamides with other polymers such as silk fibres for the purpose of obtaining a homogeneous blend of the polyamide with the silk material. The process of the present invention makes no claim to the methods described in either of the aforementioned specifications.

The object of the invention is the conversion of material of the described type, preferably waste fibres, having negligible rates of moisture affinity as regards adsorption and release, into highly adsorbent products. The treated polymers consist of particles in very finely divided form comprising an inert nucleus and a porous adsorbent surface layer, or consisting of particles having a bonded membrane of silk fibroin attached to and diffused into the surface of the polyamide nucleus.

Some of the products obtained according to the process of the invention may be used in preparations which require the incorporation of material having a thinner surface layer attached to the resilient inert core while others in their modification of highly adsorbent composition products may vary considerably in the molecular weight of the polyamide nucleus and the bonded surface membrane of silk fibroin, thus showing a particular and marked differentiation in density and hardness between the polyamide core and the silk fibroin attachment. These new adsorbent compositions are valuable under conditions where the factors of surface tension, adsorption or the retention capacity for moisture, dyes, drugs and the like are to be considered.

Dispersions, suspensions, powders, pastes and/or compressed tablets manufactured according to the present invention and its modifications are useful as constituents or ingredients of toilet preparations and cosmetics, lipsticks, nail lacquers, face and dusting powders, soaps, detergents, emulsifying waxes, therapeutical and dental preparations, filtering agents and for other purposes where the specific adsorbent properties of the material of the invention are required.

According to the invention a process for the treatment of fibrous material including waste of synthetic linear polyamides and similar polymers commonly known as nylon, to produce an amorphous substance with an adsorbent surface, consists in treating the materials with solvents to destroy their filamentary nature, introducing prior to the precipitation silk waste into the polyamide solution and subsequently subjecting the mass to a treatment with an oxidising alkaline solution or to a treatment with an oxidising alkaline silk fibroin solution during the step of precipitation, said silk addition acting as a bonding or sizing agent which is finally attached to the precipitated polyamide groupings in form of an adsorbent layer of variable thickness, according to the quantity of the added silk fibres or silk fibroin.

Synthetic linear polyamide fibres are by this process converted into amorphous groupings, which according to the modifications of the process used, constitute agglomerations of colloidal particles offering reduced or no resistance to further disintegration, dispersion or comminution.

Degrading solvents according to the invention which may be employed are sulphuric acid, hydrochloric acid, formic acid, phenols, cresols and alkalis according to the type of polymers to be reacted. The solvents may be used either alone or in combination with one another or in admixture with media miscible or combining with the solvent.

The following are examples of preferred ways of carrying the invention into effect, describing by way of example some of the modifications of the invention:

*Example I*

233 grammes of nylon waste, for example polyhexamethylene adipamide, after the usual preliminary cleaning in any known manner, are treated with 1000 grammes of 50% sulphuric acid at normal temperature. When the charge has been degraded, which operation may be accelerated by heat, pressure and agitation, a hydrolised solution of silk fibroin, prepared from 30 grammes silk waste fibres, 300 cc. of a 5% sodium hydroxide lye and 25-30 cc. of hydrogen peroxide 20 vols. which has been extended with 500 cc. of water, is then carefully passed or blown through a disperser into the polyamide solution under agitation, by which a friable precipitate of silk fibroin coated polyamide, consisting of an amorphous agglomeration of colloidal particles is formed. The fluid which may be recovered, is drained off and the residue purified. Traces of the solvent may be removed in any suitable manner to obtain a substantially neutral product. The precipitate, showing a marked porosity and adsorbency may then be finally washed and collected, followed, if required, by the further step of dehydration and comminution into a finely divided powder. The product thus obtained shows a distinctive permeable membrane or surface area of silk fibroin which is attached to or diffused into the polyamide nucleus.

*Example II*

90 grammes of waste polymer of aminocaprolactam (nylon 6) are treated with diluted hydrochloric acid (50%) at 85° C. until the filamentary nature of the mass has completely disappeared. 10 grammes of natural silk fibres are then added to the polyamide solution and dissolved. The mixture is agitated and then allowed to stand for say 30-45 minutes after which time it is passed into 5% alkaline oxidising solution containing a persalt for example 45 grammes of peroxyborate or 22 grammes hydrogen peroxide while rapidly agitating the mass, by which step a precipitate of colloidal particles of inert polyamide nuclei with adsorbent silk fibroin layers is obtained, the resulting material being collected, purified dehydrated and comminuted into a powder.

*Example III*

50 grammes of a polymerisation waste product comprising hexamethylene diamine and suberic acid (nylon 68 polymer) and silk waste may be dissolved in 80% sulphuric acid and reacted with about 550 grammes of a higher fatty alcohol, for example, stearyl alcohol, at 60° C. for 1-2 hours with subsequent neutralisation of the melt with the correct amount of alkali, the resulting product containing a polyamide-carboxylic fibroin condensate. This compound forms an emulsion to which wax may be added for ointment bases for example in the following ratio:

| | Per cent |
|---|---|
| Glyceryl mono-stearate | 10 |
| Cetyl alcohol | 85 |
| Polyamide-fibroin sodiumstearylsulphate | 5 |

An alternative method of carrying out the process of the invention according to this latter example may be by treating fatty acids or alcohols with a polyamide/sulphuric acid solution of suitable concentration and neutralising the sulphated polyamide stearyl mixture with a sodium fibroin solution.

*Example IV*

50 grammes of nylon 56 polymer waste (pentamethylene adipamide) and 30 grammes of silk waste are dissolved in 275 grammes of boiling hydrochloric acid. The mass is agitated and dispersed into a 5 per cent aqueous solution of potassium hydroxide to which 30 grammes of peroxyborate have been added. The precipitate is collected, neutralised, washed, dried and screened.

*Example V*

50 grammes of nylon 610 polymer of hexamethylene sebacamide are treated with a mixture of 75 grammes cresol and 175 grammes hydrochloric acid until the filamentary nature of the mass has completely disappeared. 30 grammes of natural silk fibre waste is added to the solution and dissolved. The mass is agitated and passed into an alkaline oxidising solution as in Example IV, then extended with water and the purified precipitate incorporated into soap, e. g. for use as a surgical soap, exhibiting improved cleansing and rinsing off properties.

Detergents, wetting agents and soapless shampoos either in liquor or solid form may be produced according to the invention by treating hydrocarbons or lower members of the fatty alcohol series by sulphation in presence of polymeric degradation products resulting for example in the production of polyamide alkyl sulphates, vinylfibroin laurate and the like.

For the production of soaps containing polymeric condensation products according to the invention, it may be convenient to incorporate the polymeric condensate into the fatty acids in the dispersed or emulsified state and to react the mixture subsequently with a suitable alkali.

The adsorbent condensation products in the form of finely divided powder fulfill the requirements of a perfect ingredient for face powders with regard to slip and adherence.

The further advantage of fibroin-modified polyamide powder consists in the manufacture of an exceedingly transparent substance which when dyed produces new effects of lustre and colours owing to the double refraction of the inert nucleus.

When in contact with the human skin in form of a face powder, toilet creams and other preparations for the skin, the adsorbent type of the condensation products promotes the circulation of air and moisture near the skin in a physiological optimum of surface evaporation.

The adsorbent layer or membrane may be used as a vehicle for drugs, dyes, antiseptics or other substances for purposes where the application of active ingredients in even distribution over a large surface area is essential.

Surface-active inert media incorporated in emulsifying waxes and the like, as described, have definite value in the pharmaceutical and cosmetic technique. Being different from the usually known ointment bases they have a marked bearing on the constant of adsorption of the therapeutical agent, especially when the variations of the increase or decrease of the pH value of the human skin has to be taken into account.

In the application of the products of the invention to dental preparations the aggregation of a resilient surface membrane in connection with an inert nucleus of different density represents a new and satisfactory ingredient for use in dentifrices and the like where a stable and harmless semi-abrasive of considerable adsorption power is required.

The polymeric degradation products and their modifications may be used in the form of sols, gels, dispersions, suspensions, emulsions, powders, pastes, and/or compressed tablets either alone or in admixture with other substances in cosmetic and toilet preparations, therapeutical and dental products and for other unspecified industrial purposes.

What I claim is:

1. A process of reducing polyamides and their derivatives selected from the group comprising polyhexamethylene adipamide, polydecamethylene sebacamide, caprolactam and interpolyamides of amino-caproic acid with caprolactam into finely divided particles having distinctive adsorbency that comprises combining (a) said polyamides in an aqueous strong inorganic acid solution, (b) an oxidizing alkaline solution, and (c) silk fiber material dissolved in one of said solutions thereby precipitating the dissolved materials from said combined solution, said precipitated materials being a friable agglomeration of colloidal particles having an adsorbent silk fibroin membrane or coating attached to the polyamide nucleus, removing the solvent, washing the precipitated product, drying the wash product and comminuting it into a fine powder.

2. A process as claimed in claim 1 wherein said oxidizing alkaline solution is an aqueous solution of an alkali metal hydroxide in the presence of a persalt.

3. A process as claimed in claim 1 wherein said oxidizing alkaline solution is an aqueous solution of an alkali metal hydroxide in the presence of hydrogen peroxide.

4. A process as claimed in claim 1 wherein said silk fibre material is dissolved in the polyamide solution.

5. A process as claimed in claim 4 wherein said oxidizing alkaline solution is an aqueous solution of an alkali metal hydroxide in the presence of a persalt.

6. A process as claimed in claim 4 wherein said oxidizing alkaline solution is an aqueous solution of an alkali metal hydroxide in the presence of hydrogen peroxide.

7. A process as claimed in claim 1 wherein said silk fibre material is dissolved in said oxidizing alkaline solution.

8. A process as claimed in claim 7 wherein said oxidizing alkaline solution is an aqueous solution of an alkali metal hydroxide in the presence of a persalt.

9. A process as claimed in claim 7 wherein said oxidizing alkaline solution is an aqueous solution of an alkali metal hydroxide in the presence of hydrogen peroxide.

References Cited in the file of this patent

UNITED STATES PATENTS

| Number | Name | Date |
|---|---|---|
| 2,289,775 | Graves | July 14, 1942 |

FOREIGN PATENTS

| Number | Country | Date |
|---|---|---|
| 626,380 | Great Britain | July 14, 1949 |